United States Patent [19]

Vincler et al.

[11] Patent Number: 4,588,572
[45] Date of Patent: May 13, 1986

[54] PROCESS FOR PREPARING AQUEOUS COBALT (II) CARBONATE SLURRIES, AND SLURRIES SO PRODUCED

[75] Inventors: Michael P. Vincler, Seneca, Pa.; Thomas E. Meigs, Parma, Ohio

[73] Assignee: Mooney Chemicals, Inc., Cleveland, Ohio

[21] Appl. No.: 660,022

[22] Filed: Oct. 12, 1984

[51] Int. Cl.⁴ .............................................. C01B 31/24
[52] U.S. Cl. ................................ 423/419 R; 423/144
[58] Field of Search ........................... 423/419 R, 144

[56] References Cited

U.S. PATENT DOCUMENTS 3,989,195 11/1976 Falcon-Steward ................... 241/16
4,186,028 1/1980 Woditsch et al. ................... 106/300
4,477,422 10/1984 Ginn .................................... 423/111

FOREIGN PATENT DOCUMENTS 0021099 2/1978 Japan ............................. 423/419 R

OTHER PUBLICATIONS

J. C. Bailer, Jr., editor, Comprehensive Inorganic Chemistry, Pergamon Press, London, 1973, vol. 3, p. 1072.
Joseph William Mellor, A Comprehensive Treatise on Inorganic and Theoretical Chemistry, vol. XIV, Fe (Part 3), Co.
Longmans, Green and Co., London, 1935, pp. 808-821.
Douglas A. Skoog et al, Fundamentals of Analytical Chemistry, Holt, Rinehardt and Winston, N.Y., Copyright 1963, pp. 173, 174, 185.
Encyclopedia of Industrial Chemical Analysis, vol. 10, edited by F. D. Snell and L. S. Ettre, Interscience Publishers, 1970, p. 332.

Primary Examiner—John Doll
Assistant Examiner—Jackson Leeds
Attorney, Agent, or Firm—Renner, Otto, Boisselle & Lyon

[57] ABSTRACT

A cobalt carbonate slurry and method for making same is described. The method comprises steps of reacting a water-soluble cobalt (II) salt with a water-soluble carbonate in aqueous solution in an inert atmosphere to form the desired cobalt carbonate and a water-soluble salt as a by-product; filtering the resultant cobalt carbonate; washing the resultant wet filter cake and preparing an aqueous slurry of cobalt carbonate from the wet filter cake. Preferably, the slurry is made to a pumpable viscosity. Additives may be used for specific applications to retard settling. Slurries prepared from the wet filter cake are superior to those prepared from the dry powder form because they are more uniform and stable for longer periods of time and resuspend more readily.

14 Claims, No Drawings

PROCESS FOR PREPARING AQUEOUS COBALT (II) CARBONATE SLURRIES, AND SLURRIES SO PRODUCED

BACKGROUND OF THE INVENTION

The present invention relates to the production of cobalt carbonate slurries and to slurries so prepared. Slurries of cobalt carbonate are useful where an aqueous mixture of cobalt (II) is desired. Because cobalt carbonate is not water-soluble, a uniform and stable slurry is important to its application to liquid phase reactions and applications.

Past methods of producing cobalt slurries have involved suspending cobalt carbonate powder in water. The cobalt carbonate is produced by conventional chemical conversion after which the product is dried and ground into a powder. This grinding is necessary because the consistency of the dried cobalt carbonate product does not allow efficient and stable resuspension of the product. The powder is then shipped in bags and resuspended at the destination. Even with the powdering, the resuspension results are not optimal. Slurries prepared from the dried powder are difficult to resuspend and, therefore, it is difficult to prepare stable slurries. Often the cobalt carbonate settles as a hard mass which is difficult, if not impossible, to resuspend.

The drying, grinding and bagging processes are expensive and the cobalt carbonate powder presents a health hazard to those exposed to it.

SUMMARY OF THE INVENTION

The invention is a process in which cobalt carbonate is produced and maintained in an aqueous environment. The product is shipped in slurry form. Also claimed is the product of this process.

For the manufacturer, this process obviates the aforementioned drying, grinding and bagging, saving energy and capital. Furthermore, the purchaser is spared the costs of emptying and disposing of the powder bags. It also eliminates the problem of dust clean-up and the health hazard attendant to the airborne cobalt carbonate dust.

DESCRIPTION OF THE PREFERRED EMBODIMENT

The cobalt carbonate is produced by converting a water-soluble cobalt (II) salt to the carbonate form by reacting it with a water-soluble carbonate in an aqueous solution under an atmosphere of carbon dioxide. The general reaction is:

$$CoX + MCO_3 = CoCO_3 + MX$$

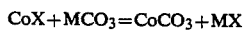

M = cation.
X = anion.

Any combination of cation (M) and anion (X) can be used in the above reaction so long as the reactants and the resultant by-product salt are soluble in water. Generally, the cations used are metals or ammonium ions. The most common metals used are alkali metals (e.g., sodium, potassium and lithium); and of these, sodium and potassium are preferred. Specific examples of the water-soluble carbonate reactant include sodium carbonate, potassium carbonate and ammonium carbonate. Examples of suitable anions include the sulfate, nitrate acetate, benzoate, iodide and chloride ions. The preferred anion is sulfate. Specific examples of useful cobalt salts include cobalt sulfate, cobalt nitrate and cobalt acetate.

The reaction proceeds through a number of distinct steps.

The first step is to make an aqueous solution of a cobalt (II) salt at any desired concentration. This solution is placed in a reaction vessel which is fitted to allow gas infusion, and an carbon atmosphere of carbon dioxide is maintained. Carbon dioxide, is bubbled into the solution.

An aqueous carbonate solution, e.g., sodium carbonate at 20% by weight, is slowly added at ambient temperature over a period of hours; one to three hours is typical. The amount of the carbonate added generally should be at least about one equivalent for each equivalent of cobalt (II) salt present in the reaction vessel. Alternatively the water-soluble carbonate can be added as a powder to the cobalt (II) salt solution.

The third general step is to heat the mixture to approximately 130° F. while maintaining the atmosphere of carbon dioxide over the solution. The temperature of the reaction during this step should not exceed 140° F. This step is carried out over a period of one to five or ten hours. Heating beyond ten hours is not necessary. Optimal times appear to be between three and five hours for this step.

One method of determining when the reaction between the cobalt salt and metal carbonate is completed involves the following procedure. A sample of the reaction mixture is removed and centrifuged, and the color of the mother liquor on top observed. If it shows any reddish color and is not water-white, more metal carbonate solution (e.g., another 0.5 to 1.0% of the amount originally charged) is added to the reaction mixture. The reaction mixture is then mixed and heated for an additional period, e.g., about 30 minutes and resampled. Testing is repeated until no color is visible in the mother liquor of a centrifuged sample shows no color. At this point, the reaction is complete.

Another way to test for completion of the reaction is to measure the pH of the reaction mixture until a sharp rise in pH is observed. This signals the completion of the reaction.

The reaction mixture is then heated to a temperature up to about 180° F. or higher (preferably between about 140° and 160° F.). By no means should the reaction temperature be allowed to exceed 212° F.

The solid cobalt carbonate formed in the reaction is filtered and washed. The filter cake should not be allowed to become dry. After washing, the wet filter cake is made into a slurry by the addition of water. The composition of the slurry can be between 5 and 40% cobalt carbonate by weight, and generally should not exceed 50% cobalt carbonate by weight unless one or more surfactants are included in the slurry as described more fully below. Ideally, the composition is about 20% cobalt by weight.

In order to form the preferred and desired neutral (pink) cobalt carbonate, three conditions should be achieved. The initial reaction must be carried almost to completion at or below 130° F.; there must be an atmosphere of carbon dioxide in the reactor; and the cobalt (II) salt cannot be the reactant in excess when the contents are heated from 130° to 180° F.

The cobalt carbonate slurries prepared in this manner are readily pumpable and stable. Although some cobalt carbonate solids may settle, especially on prolonged standing, these solids are easily resuspended. Generally, the agitation and movement resulting from merely pumping the slurry will be sufficient to resuspend the solids.

Depending on circumstances and desired end use, cobalt carbonate slurries prepared in accordance with the invention also can contain at least one surfactant. Surfactants, or certain types of surfactants should be avoided if they have any deleterious affect on the desired end use for the cobalt carbonate slurry. Preferably, the surfactants are anionic or nonionic surfactants although anionics appear to provide improved results. Many such surfactants are known in the art. See, for example, McCutcheon's "Detergents and Emulsifiers", 1979, North American Edition, published by McCutcheon's Division, MC Publishing Corporation, Glen Rock, New Jersey, U.S.A., particularly pages 15–20 which are hereby incorporated by reference for their disclosure in this regard.

In general, the nonionic surfactants such as those containing either linkages are particularly useful. Examples of such ether-containing surfactants are those having the general formula

$$R_1\text{---}O\text{---}[(CH_2)_nO]_xH$$

wherein $R_1$ is an aryl or alkyl group containing from about 6 to 20 carbon atoms, n is two or three, and x is an integer between 2 and 100. Such surfactants are produced generally by treating fatty alcohols or alkylsubstituted phenols with excess ethylene oxide or propylene oxide. The alkyl carbon chain may contain from about 14 to 24 carbon atoms and may be derived from a long chain fatty alcohol such as oleyl alcohol or stearyl alcohol.

Nonionic polyoxyethylene compounds of this type are described in U.S. Pat. No. 3,855,085. Such polyoxyethylene compounds are available commercially under the general trade designations "Surfynol" by Air Products and Chemicals, Inc. of Allentown, Pa., and under the designation "Pluronic" or "Tetronic" by BASF Wyandotte Corp. of Wyandotte, Mich. Examples of specific polyoxyethylene condensation products include "Surfynol 465" which is a product obtained by reacting about 10 moles of ethylene oxide with 1 mole of tetramethyldecynediol. "Surfynol 485" is the product obtained by reacting 30 moles of ethylene oxide with tetramethyldecynediol. "Pluronic L 35" is a product obtained by reacting 22 moles of ethylene oxide with polypropylene glycol obtained by the condensation of 16 moles of propylene oxide. Another example is Atlox 1045A from ICI America, Inc. which is a polyoxyalkylene sorbitol oleate-laurate mixture.

Amine, long chain fatty amine, long chain fatty acid, alkanol amines, diamines, amides, alkanol amides and polyglycol-type surfactants known in the art also can be included. One type is the group obtained by the addition of a mixture of propylene oxide and ethylene oxide to diamines. More specifically, compounds formed by the addition of propylene oxide to ethylene diamine followed by the addition of ethylene oxide are useful and are available commercially from BASF Wyandotte Inc. Chemical Group under the general trade designation "Tetronic".

Carbowax-type wetting agents which are polyethylene glycols having different molecular weights also can be used. For example Carbowax No. 1000 has a molecular weight range of from about 950 to 1050 and contains from 20 to 24 ethoxy units per molecule. Carbowax No. 4000 has a molecular weight range of from about 3000 to 3700 and contains from 68 to 85 ethoxy units per molecule. Other known nonionic glycol derivatives such as polyalkylene glycol ethers and methoxy polyethylene glycols which are available commercially can be utilize as surfactants in the compositions of the invention.

Anionic surfactants also are useful in the aqueous systems of the invention. Among the useful anionic surfactants are the widely-known metal carboxylate soaps, organo sulfates, sulfonates, sulfocarboxylic acids and their salts, and polyelectrolytes. Various anionic surfactants are readily available commercially, and further information about anionic surfactants can be found in the text "Anionic Surfactants" Parts II and III, edited by W. M. Linfield, published by Marcel Dekker, Inc., New York, 1976. Examples of anionic surfactants available from ICI America, Inc. include Atlas G-2205 which is an aromatic phosphate and Atlas G-3300 which is an alkyl aryl sulfonate. Examples of anionic surfactants available from Rohm and Haas Company include Triton 770 which is a sodium salt of an alkyl aryl polyether sulfate, Triton GR-5M which is a dioctyl sodium sulfosuccinate, Triton H-55 which is a phosphate surfactant, potassium salt, Triton W-30 and Triton X-200 which are sodium salts of alkyl aryl polyether sulfonates, etc. Darvan C (a salt of a carboxylated polyelectrolyte) available from R. T. Vanderbilt Chemical Co. is particularly useful in the slurries of the invention.

Mixtures of the nonionic and anionic surfactants can and are generally utilized in the aqueous systems of the present invention. The amount of surfactant contained in the aqueous mixture can vary over a wide range, but when used, the amount is generally from 0.10% to about 7.5% and more preferably between 0.1% and 0.5% by weight.

Thickeners such as cellulose derivatives can be added if it is desired to increase the viscosity of the slurry. An example is carboxymethyl hydroxyethyl cellulose.

The following examples illustrate the production of cobalt carbonate and the preparation of the product slurry. Unless otherwise indicated in these examples or elsewhere in this application, all parts and percentages are by weight and temperatures are in °F.

EXAMPLE 1

The production of cobalt carbonate in slurry form proceeds through the following steps:

(1) The reactor is charged with an aqueous cobalt sulfate solution (8% cobalt). Carbon dioxide is gently sparged through the solution and a carbon dioxide atmosphere is maintained.

(2) While agitating the cobalt sulfate solution, an aqueous sodium carbonate solution (20% w/w) is added at ambient temperature over a period of one to three hours. At this point the reaction vessel should contain nearly equal amounts of cobalt sulfate and sodium carbonate on a mole basis.

(3) The contents of the reactor are heated to 130° F. This temperature is maintained while samples are centrifuged and checked for color as described above and while any subsequent sodium carbonate additions are made.

(4) The contents of the reactor then are heated to a temperature of 180° F. for a period of about two hours.

(5) The resultant cobalt carbonate slurry is filtered and the cobalt carbonate product (filter cake) is then washed with deionized water.

(6) The wet cobalt carbonate filter cake is then removed from the filter for slurry preparation.

(7) A slurry is prepared by adding water to the wet cake with mixing until the desired concentration and/or viscosity is achieved. Good results are achieved where the slurry is diluted to approximately 20% cobalt.

EXAMPLE 2

An aliquot of Darvan C from Vanderbilt Chemical is mixed with the slurry of Example 1 to reduce the viscosity further if desired. In this example, the concentration of Darvan C is 0.1%.

EXAMPLE 3

A slurry is prepared from a wet filter cake prepared as in Example 1 by mixing the filter cake with water and Darvan C to provide a slurry containing 60% cobalt carbonate, 0.5% Darvon C, and water.

In summary, the claimed invention gives the user many technical and economic advantages. One advantage of cobalt carbonate slurries prepared in accordance with the invention is that they are more uniform and stable for longer period of time, and then resuspend more readily than those prepared from the dried powdered cobalt carbonate.

Use of the slurried cobalt carbonate prepared in accordance with this invention eliminates the costs of grinding and bagging the cobalt carbonate powder. Clean-up costs attendant to use of the powdered form are likewise eliminated.

We claim:

1. A process for preparing an aqueous cobalt (II) carbonate slurry which comprises the steps of:
   (a) reacting a water-soluble cobalt (II) salt with a water-soluble carbonate in water and in an inert atmosphere at a temperature of up to about 130° F., the equivalent ratio of said water-soluble carbonate to said cobalt (II) salt being at least about 1:1,
   (b) completing the reaction by raising the reaction temperature to a temperature between about 140° and about 212° F. whereby a mixture of cobalt carbonate and a water-soluble by-product salt in water is obtained,
   (c) filtering the mixture and recovering a wet filter cake,
   (d) washing the wet filter cake with water, and
   (e) preparing an aqueous slurry of cobalt carbonate from the wet filter cake.

2. The process of claim 1 wherein said water-soluble carbonate is an alkali metal or ammonium carbonate.

3. The process of claim 1 wherein said water-soluble carbonate is sodium carbonate.

4. The process of claim 1 wherein said cobalt (II) salt is cobalt sulfate.

5. The process of claim 1 wherein the reaction in step (a) is conducted for a period of up to about five hours.

6. The process of claim 1 wherein said slurry prepared in step (e) contains up to about 50% by weight of cobalt carbonate.

7. The process of claim 1 wherein said slurry prepared in step (e) contains about 20% by weight of cobalt.

8. The process of claim 1 wherein a surfactant is included in the slurry prepared in step (e), and the slurry contains up to about 70% by weight of cobalt carbonate.

9. The process of claim 8 wherein said surfactant is a polyelectrolyte.

10. The process of claim 1 wherein said water-soluble carbonate is added as an aqueous solution to an aqueous solution of cobalt (II) in step (a) over a period of about one to three hours at ambient temperature in an atmosphere of carbon dioxide, and the mixture then is heated to a temperature of up to about 130° F.

11. An aqueous cobalt carbonate slurry prepared in accordance with the process of claim 1.

12. An aqueous cobalt carbonate slurry prepared in accordance with the process of claim 10.

13. A process for preparing an aqueous cobalt (II) carbonate slurry which comprises the steps of:
   (a) reacting a water-soluble cobalt (II) salt with a water-soluble carbonate in water and in an atmosphere of carbon dioxide at a temperature of up to about 130° F., the equivalent ratio of said water-soluble carbonate to said cobalt (II) salt being at least about 1:1,
   (b) completing the reaction by raising the reaction temperature to a temperature of between about 140° F. and about 212° F., the equivalents of said cobalt (II) salt present in this step being less than the equivalents of said water-soluble carbonate present in this step, whereby a mixture of cobalt carbonate and a water-soluble by-product salt in water is obtained,
   (c) filtering the mixture and recovering a wet filter cake,
   (d) washing the wet filter cake with water, and
   (e) preparing an aqueous slurry of cobalt carbonate from the wet filter cake.

14. The process of claim 13 wherein the reaction in step (a) is conducted for a period of up to about 5 hours.

* * * * *